(12) United States Patent
Lacy et al.

(10) Patent No.: US 7,728,911 B2
(45) Date of Patent: Jun. 1, 2010

(54) POSITIVELY INDICATING TO USER WHETHER SIGNAL HAS BEEN DETECTED ON EACH VIDEO INPUT

(75) Inventors: Reed H. Lacy, Corvallis, OR (US); Guy C. Heagney, Albany, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 919 days.

(21) Appl. No.: 11/043,533

(22) Filed: Jan. 26, 2005

(65) Prior Publication Data

US 2006/0164561 A1   Jul. 27, 2006

(51) Int. Cl.
*H04N 5/50*   (2006.01)
*H04N 5/268*   (2006.01)

(52) U.S. Cl. .................. 348/706; 348/569; 348/563; 348/705

(58) Field of Classification Search ......... 348/705–706, 348/563–565, 569, 552, 554, 734, 570, 731–732, 348/722, 725; *H04N 5/50, 5/268*
See application file for complete search history.

(56) References Cited

U.S. PATENT DOCUMENTS

| 5,572,263 | A  | * | 11/1996 | Kim et al. .................. 348/705 |
| 6,191,760 | B1 |   | 2/2001  | Jun et al. |
| 6,346,927 | B1 |   | 2/2002  | Tran et al. |
| 6,473,135 | B1 | * | 10/2002 | Iwamura .................... 348/706 |
| 6,587,154 | B1 | * | 7/2003  | Anderson et al. ........... 348/553 |
| 6,753,928 | B1 | * | 6/2004  | Gospel et al. ............... 348/569 |
| 7,298,424 | B2 | * | 11/2007 | Oh ............................. 348/706 |
| 7,372,506 | B2 | * | 5/2008  | Cho ............................ 348/569 |
| 2002/0171762 | A1 |   | 11/2002 | Maxson et al. |
| 2003/0197783 | A1 |   | 10/2003 | Woody, Jr. et al. |
| 2004/1145680 |    |   | 7/2004  | Bennett |
| 2004/0239816 | A1 |   | 12/2004 | Ando |
| 2004/0252237 | A1 | * | 12/2004 | Park et al. .................... 348/552 |
| 2005/0018084 | A1 | * | 1/2005  | Cho ............................ 348/569 |
| 2005/0134746 | A1 | * | 6/2005  | Brandt ....................... 348/705 |

FOREIGN PATENT DOCUMENTS

DE    201 16 386 U1    12/2001

OTHER PUBLICATIONS

Dux Computer Digest, Frequently Asked Questions: Monitors, http://www.duxcw.com/faq/mon, Dec. 23, 2002.
iScan Pro, Review at www.laaudiofile.com/iscanpro.html, product data sheet, product manual, all references no later than Jun. 2001.

* cited by examiner

*Primary Examiner*—Trang U Tran

(57) ABSTRACT

A method detects whether a signal is present on each of a plurality of video inputs. The method positively indicates to a user whether a signal has been detected on each of the plurality of video inputs.

26 Claims, 5 Drawing Sheets

POSITIVELY INDICATING TO USER WHETHER SIGNAL HAS BEEN DETECTED ON EACH VIDEO INPUT

BACKGROUND

Display devices, such as projectors and flat-panel displays, display image data that is received from video source devices, such as DVD players, cable TV and satellite TV set-top boxes, video cassette players or recorders, and the like. As such, display devices have one or more video inputs that are receptive to connecting cables. The connecting cables connect the video source devices to the display devices in accordance with a predetermined format or form factor, such as s-video, component video, composite video, VGA, HDMI, and DVI.

When a display device is not functioning as expected, such as when a user expects it to be displaying image data from a given video source device and the display device is not displaying the image data, many different potential causes of the problem have to be examined. The connecting cable from the video source device to the display device may be defective, the video source device may be defective, or the display device itself may be defective, for instance. Each potential cause of the problem should be examined and ruled out, until the actual cause of the problem is discovered. However, ruling out potential causes of the problem can be difficult for the average user to accomplish.

BRIEF DESCRIPTION OF THE DRAWINGS

The drawings referenced herein form a part of the specification. Features shown in the drawing are meant as illustrative of only some embodiments of the invention, and not of all embodiments of the invention.

DETAILED DESCRIPTION OF THE DRAWINGS

In the following detailed description of exemplary embodiments of the invention, reference is made to the accompanying drawings that form a part thereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, electro-optical, software/firmware and other changes may be made without departing from the spirit or scope of the present invention. The following detailed description is, therefore, not to be taken in a limiting sense, and the scope of the present invention is defined only by the appended claims.

Figure 1:
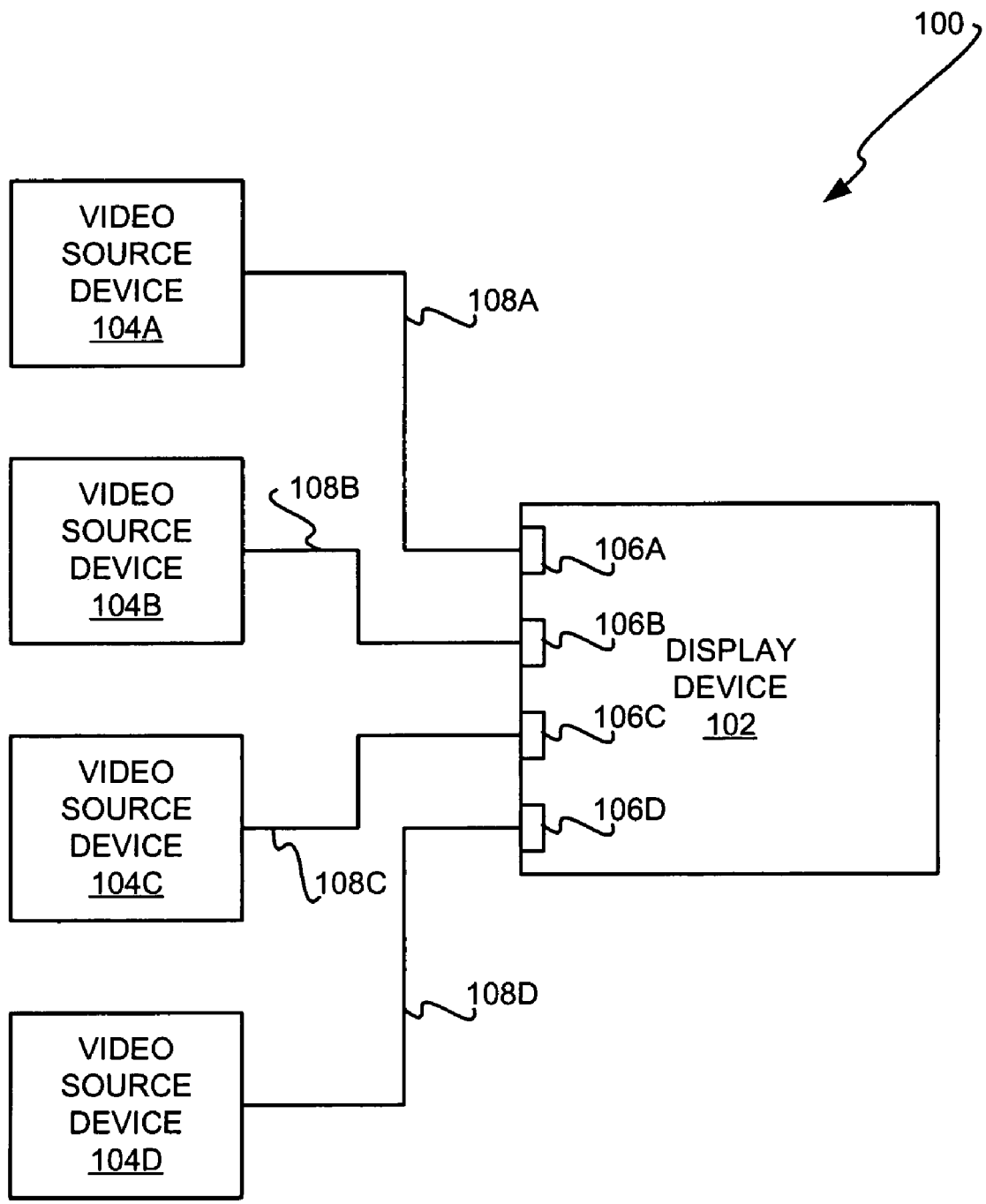
FIG. 1 is a diagram of a representative system including a display device connected to a number of video source devices, according to an embodiment of the invention.

FIG. 1 shows a system 100, according to an embodiment of the invention. The system 100 includes a display device 102, and video source devices 104A, 104B, 104C, and 104D, collectively referred to as the video source devices 104. The display device 102 may be a projector, a flat-panel display like a plasma display or a liquid-crystal display, a cathode ray-tube display, or another type of display device. The video source devices 104 may be DVD players, cable TV or satellite TV set-top boxes, video cassette players or recorders, or other types of video source devices. While there are four video source devices 104 in FIG. 1, there may be more or less of the video source devices 104 in other embodiments.

The display device 102 has a number of video inputs 106A, 106B, 106C, and 106D, collectively referred to as the video inputs 106. The video inputs 106 are receptive to connecting cables 108A, 108B, 108C, and 108D communicatively coupled to the video source devices 104, and are collectively referred to as the connecting cables 108. The video inputs 106 may be the same or different types of video inputs. Types of video inputs include composite video input, s-video inputs, component video inputs, RGB video inputs, VGA inputs, HDMI inputs, and DVI inputs, among other types of video inputs.

The video source devices 104 assert video signals on the connecting cables 108, and the display device 104 receive these video signals via the video inputs 106. The display device 104 is capable of detecting whether a signal is present on each of the video inputs 106. That a signal is present on a given one of the video inputs 106 means that a corresponding one of the video source devices 104 is asserting a signal on the one of the connecting cables 108 that is connected to the video input in question. A connecting cable may be properly secured between a video source device and one of the video inputs 106, but a video signal may nevertheless not be detected on the video input in question unless the video source device is asserting the signal, and the connecting cable is not defective.

Figure 2:
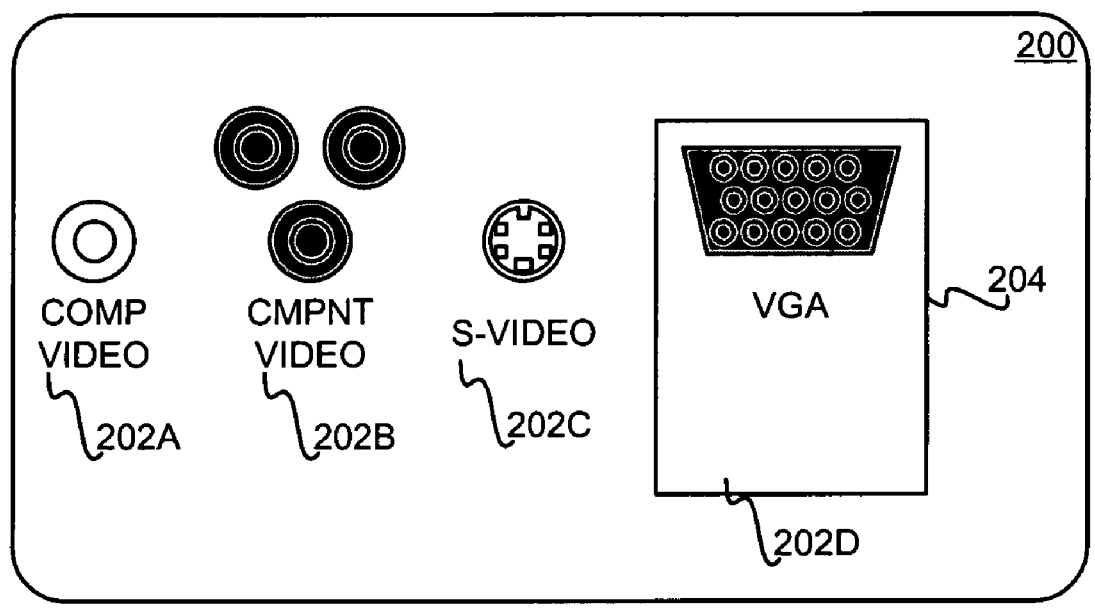
FIG. 2 is a diagram of an on-screen display (OSD) message to indicate to a user whether a signal has been detected on each video input of a display device, according to an embodiment of the invention.

FIG. 2 shows how the display device 102 positively indicates to a user whether a signal has been detected on each of the video inputs 106, according to an embodiment of the invention. The display device 102 displays an on-screen display (OSD) message 200. An OSD message is a message that is overlaid on a video signal being displayed by the display device 102. The video signal on which the message is overlaid may be a video signal received from one of the video source devices 104, or may be a video signal that is synthesized by the display device 102. For example, the display device 102 may synthesize a completely blue or black video signal where none of the video source devices 104 is outputting a video signal, so that the OSD message 200 is capable of being displayed to the user.

The OSD message 200 includes video input indication parts 202A, 202B, 202C, and 202D, collectively referred to as the video input indication parts 202, and which corresponds to the video inputs 106 of the display device 102. Each of the video input indication parts 202 includes a representation of the type of video input to which it corresponds. For instance, the part 202A shows and corresponds to a composite video input, the part 202B shows and corresponds to a component video input, the part 202C shows and corresponds to an s-video input, and the part 202D shows and corresponds to a VGA input.

If the display device 102 has detected a video signal on a given one of the video inputs 106, then the corresponding one of the video input indication parts 202 is highlighted to positively indicate to the user that a signal has been detected on the video input in question. In the example of FIG. 2, the video input indication parts 202B and 202D are highlighted, as denoted by shading, indicating that video signals have been detected on the component video input and the VGA input of the video inputs 106. Therefore, the user is able to discern at a glance which of the video inputs 106 have been detected as having video signals thereon.

The video indication part 202D in FIG. 2 is also highlighted by a frame box 204 surrounding the part 202D. The frame box 204 indicates the currently active or selected video input of the video inputs 106. That is, the frame box 204 indicates which of the video inputs 106 is currently selected as the video input, the video signal on which is to be or is being displayed by the display device 102. For example, in FIG. 2, that the video indication part 202D is highlighted by the frame box 204 means that the signal on the VGA input is to be or is being displayed by the display device 102.

The currently active or selected video input may be user determined, through a user input device such as a remote control, by controls on the display device 102 itself, or in another manner. The user may be permitted to select any of the video inputs 106 as the currently selected or active video input, or may be permitted to select the currently active video input from among those of the video inputs 106 on which video signals have been detected. In another embodiment, the display device 102 may itself determine which of the video inputs 106 is the currently selected or active video input. For instance, there may be a user-configurable priority order of the video inputs 106, such that the display device 102 selects as the currently active video input the highest priority video input on which a video signal has been detected.

The highlighting of one of the video indication parts 202 by the frame box 204 to indicate which video input is the currently selected or active video input does not affect the highlighting of the video indication parts 202 by shading to indicate on which of the video inputs video signals have been detected. For example, even though the video indication part 202D is highlighted by the frame box 204, the video indication part 202B is still highlighted by shading. This is because the component video input, to which the video indication part 202B corresponds, has been detected as having a video signal thereon. Therefore, the video indication part 202B is highlighted by shading to positively indicate to the user that the component video input has been detected as having a video signal thereon, even though the component video input is not the currently active or selected video input.

In other words, the highlighting of the video indication parts 202 by shading is controlled by whether video signals have been detected on their corresponding video inputs 106, and not by whether their corresponding video inputs 106 are the currently active or selected video input. Typically only one of the video indication parts 202 may be highlighted by the frame box 204, since typically the display device 102 is able to display just one video signal at a given time. By comparison, potentially all of the video indication parts 202 may be highlighted by shading, since potentially all of their corresponding video inputs 106 may have signals detected thereon.

Figure 3:
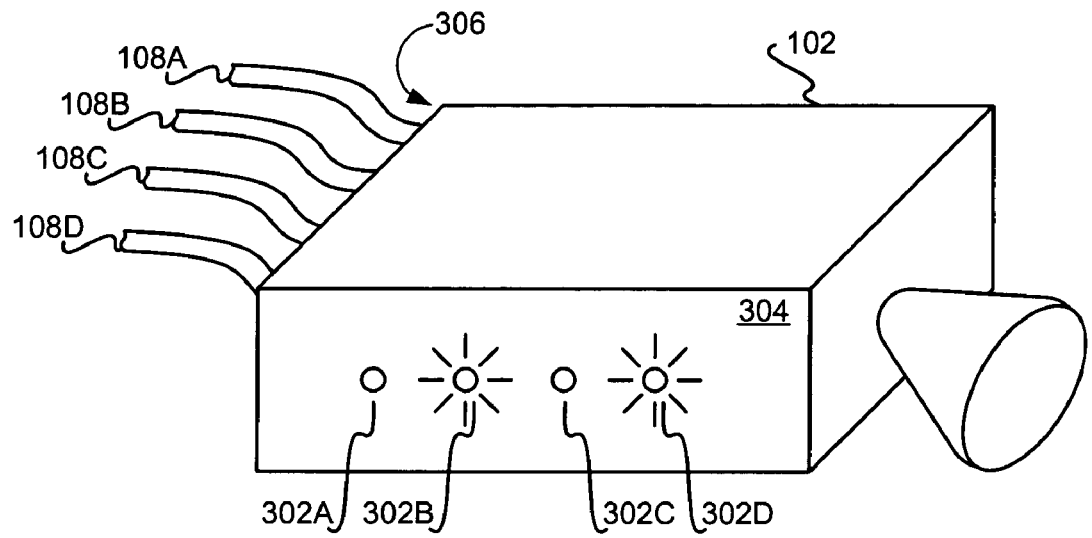
FIG. 3 is a diagram of a display device having a number of lights corresponding to the video inputs of the display device and indicating whether signals have been detected on the video inputs, according to an embodiment of the invention.

FIG. 3 shows how the display device 102 can positively indicate to a user whether a signal has been detected on each of the video inputs 106 without using an OSD message, according to an embodiment of the invention. In the example of FIG. 3, the display device 102 is specifically depicted as being a projector. The projector has a number of surfaces, including the surface 304 and the surface 306, where the surface 306 is hidden in FIG. 3. The video inputs 106 are situated or disposed within the surface 306, such that all the connecting cables 108 lead to the surface 306.

The surface 304 includes a number of lights 302A, 302B, 302C, and 302D, collectively referred to as the lights 302. The lights 302 may be light-emitting diodes (LED's), or other types of lights. Each of the lights 302 corresponds to one of the video inputs 106. In one embodiment, the lights 302 are turned on, or lit, to indicate that their corresponding video inputs 106 have had signals detected thereon. For example, in FIG. 3, the lights 302B and 302D have been turned on, indicating that the video inputs to which the lights 302B and 302D correspond have had video signals detected thereon. By comparison, the lights 302A and 302C have not been turned on, denoting that the video inputs to which they correspond have not had video signals detected thereon. Potentially, all four of the lights 302 may be turned on, where all four of the video inputs 106 have had video signals detected thereon.

In one embodiment, the lights 302 emit one color of light to indicate that video signals have been detected on their corresponding video inputs 106, and another color of light to indicate the currently selected or active of the video inputs 106. For example, the lights 302 may emit yellow light to indicate that video signals have been detected on their corresponding video inputs 106, and green light to indicate the currently selected or active of the video inputs 106. As such, at any given time, more than one of the lights 302 may emit yellow light, whereas only one of the lights may typically emit green light, because while the display device 102 may detect more than one of the video inputs 106 as having video signals thereon, typically the display device 102 is able to currently display only one of these video signals at a given time.

Figure 4:
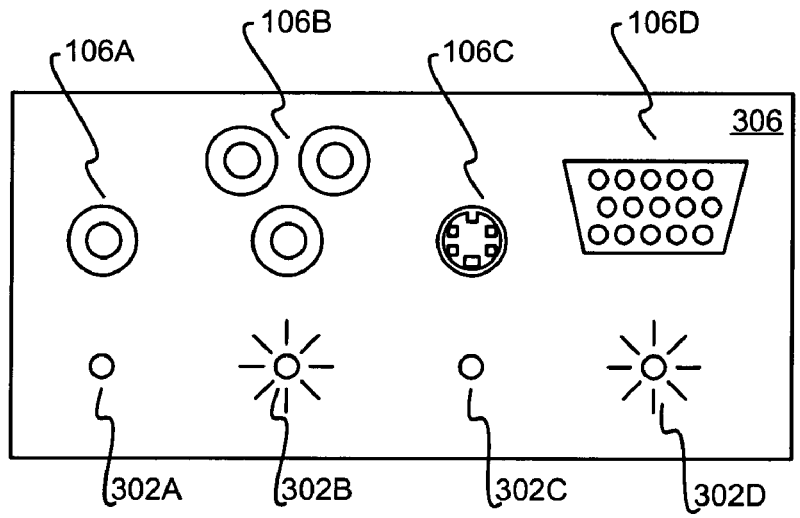
FIG. 4 is a diagram of a display device having a number of lights corresponding to the video inputs of the display device and indicating whether signals have been detected on the video inputs, according to another embodiment of the invention.
Figure 4:

FIG. 4 shows the surface 306 of the display device 102, according to a different embodiment of the invention. In FIG. 4, the lights 302 are disposed, located, or situated near or proximate to their corresponding video inputs 106, on the same surface 306, instead of on a different surface 304 as in FIG. 3. Thus, the light 302A corresponds to the video input 106A, the light 302B corresponds to the video input 106B, the light 302C corresponds to the video input 106C, and the light 302D corresponds to the video input 106D. Other than their placement on the surface 306 instead of on the surface 304, the lights 302 operate in FIG. 4 as has been described in relation to FIG. 3.

Figure 5:
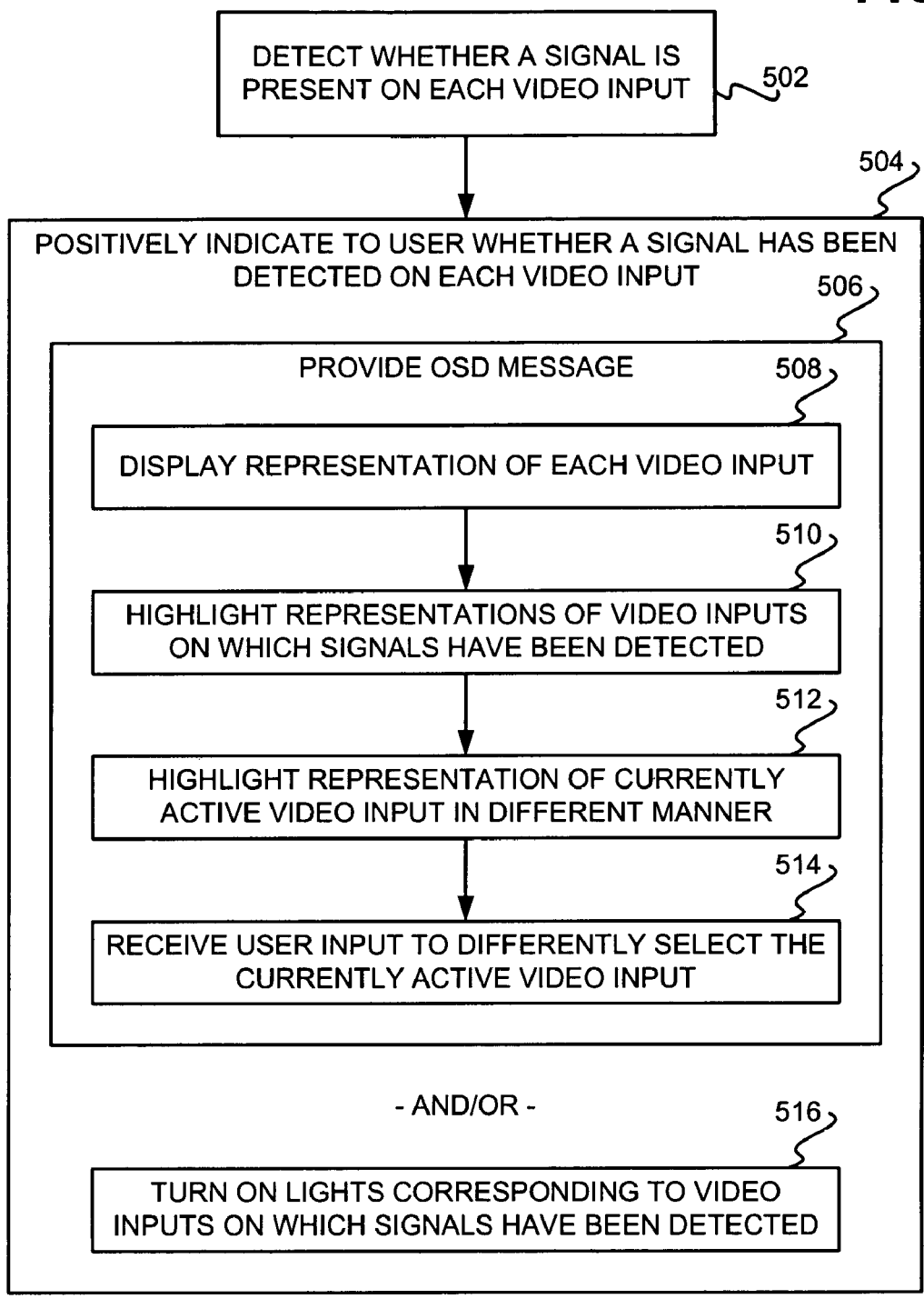
FIG. 5 is a flowchart of a method, according to an embodiment of the invention.

FIG. 5 shows a method 500, according to an embodiment of the invention. The method 500 may be implemented in whole or in part as a computer program having a number of computer program parts, such as modules, software objects, subroutines, routines, and the like. The computer program may be stored on a computer-readable medium, such as a volatile or a non-volatile medium. Types of computer-readable media include hard disk drives and other magnetic media, memories and other semiconductor media, and optical discs and other optical media.

The method 500 detects whether a signal is present on each of a number of video inputs (502). For example, the video inputs may be communicatively coupled to the same or different integrated circuits. The integrated circuits may each provide, or expose, a function that can be called to determine whether a signal is present on a given video input. The function may return true if a signal has been detected by the integrated circuit on the video input, or false if a signal has not been detected by the integrated circuit on the video input.

The method 500 then positively indicates to the user whether a signal has been detected on each video input (504). The indication to the user is positive indication in that an affirmative action is performed for each video input on which a signal has been detected. Such positive indication can include highlighting OSD representations of the video inputs, as has been described in relation to FIG. 2, and/or lighting lights corresponding to the video inputs, as has been described in relation to FIGS. 3 and 4. Positive indication is as compared to negative indication, which would include displaying a "no signal" or other message to the user when a, video signal is not detected on a given video input, or turning on a light when a video signal is not detected.

Therefore, in one embodiment, positive indication to the user is accomplished by providing an OSD message (506), as has been described in relation to FIG. 2. Specifically, in one embodiment a representation of each video input is displayed as part of the OSD message (508). The representations of the video inputs on which signals have been detected are highlighted in a particular manner (510). Furthermore, in one embodiment the representation of the currently active or selected video input may be highlighted in the OSD message in a different manner (512). User input may be received to differently select the currently active or selected video input (514). In another embodiment, lights may be turned on, or lit, when signals have been detected on the video inputs, where the lights correspond to the video inputs (516), as has been described in relation to FIGS. 3 and 4.

Figure 6:
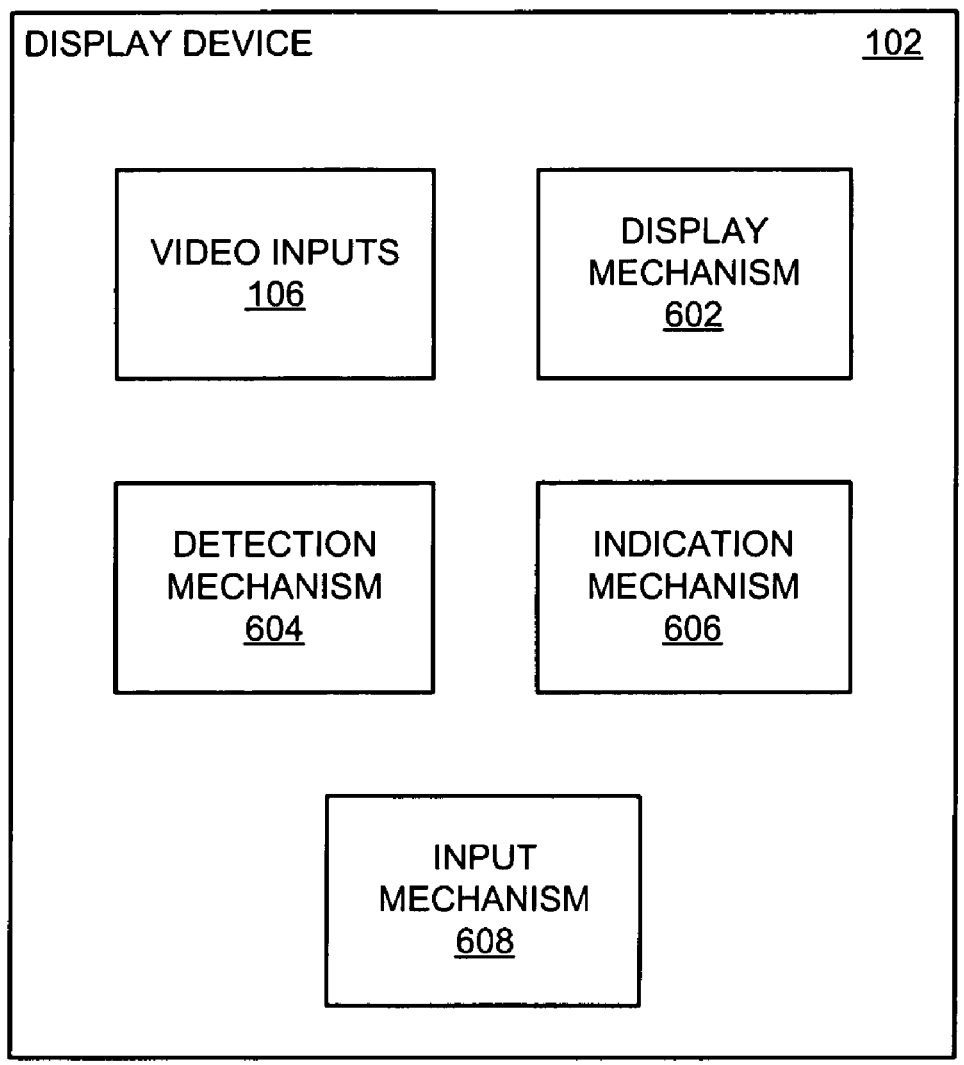
FIG. 6 is a block diagram of a rudimentary display device, according to an embodiment of the invention.

FIG. 6 shows a rudimentary diagram of the display device 102, according to an embodiment of the invention. The display device 102 is depicted in FIG. 6 as including the video inputs 106, a display mechanism 602, a detection mechanism 604, an indication mechanism 606, and an input mechanism 608. As can be appreciated by those of ordinary skill within the art, the display device 102 may include other components, in addition to and/or in lieu of those depicted in FIG. 6. The mechanisms 602, 604, 606, and 608 may each be implemented in hardware, software, or a combination of hardware and software.

The display mechanism 602 includes those components of the display device 102 needed to display a video signal received from one of the video inputs 106 to a user. As such, the display mechanism 602 may be or include a flat-panel display mechanism, such as a plasma or a liquid-crystal display mechanism, a projection mechanism, and so on. The detection mechanism 604 detects whether a video signal is present on each of the video inputs 106. The detection mechanism 604 may include one or more integrated circuits that are communicatively coupled to the video inputs 106 to perform this functionality.

The indication mechanism 606 positively indicates to the user whether a video signal is present on each video input, as has been detected by the detection mechanism 604. The indication mechanism 606 may thus provide an OSD message for display by the display mechanism 602, as has been described in relation to FIG. 2. The indication mechanism 606 may additionally or alternatively include a number of lights corresponding to the video inputs 106 that are turned on or lit when signals have been detected thereon, as has been described in relation to FIGS. 3 and 4.

Finally, the input mechanism 608 may be optionally present so that a user is able to differently select the currently active video input from among the video inputs 106. The input mechanism 608 may thus be or include a remote control, controls located on the display device 102 itself, and the like. The currently active video input is the video input that the signal present thereon is displayed by the display mechanism 602.

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. For example, where one embodiment of the invention has been described in relation to a display device, other embodiments of the invention may be amenable to implementation in relation to other types of devices, such as video processing devices that are connected between video source devices and a display device. Therefore, it is manifestly intended that this invention be limited only by the claims and equivalents thereof.

We claim:

1. A method comprising:
   detecting whether a video signal is present on each of a plurality of video inputs of a display device including all video inputs of the display device; and,
   positively indicating to a user, simultaneously for each video input in said plurality having a detected video signal and each video input in said plurality without a detected video signal, whether a video signal has been detected on said video input, comprising, for each video input,
      where a video signal has been detected on the video input, positively indicating to the user in a first manner that a video signal has been detected on the video input;
      where a video signal has not been detected on the video input, positively indicating to the user in a second manner that a video signal has not been detected on the video input, the second manner being such that the user is notified that the video input exists.

2. The method of claim 1, wherein positively indicating to the user whether a video signal has been detected on each of the plurality of video inputs comprises providing an on-screen display (OSD) message indicating whether a video signal has been detected on each of the plurality of video inputs.

3. The method of claim 2, wherein providing the OSD message indicating whether a video signal has been detected on each of the plurality of video inputs comprises, for each video input:
   displaying a representation of the video input; and,
   highlighting the representation of the video input where a video signal has been detected on the video input.

4. The method of claim 3, wherein highlighting the representation of each video input where a video signal has been detected on the video input comprises highlighting the representation in the first manner, the method further comprising:
   highlighting the representation of a currently active video input in the second manner; and,
   receiving user input to differently select the currently active video input from among the plurality of video inputs.

5. The method of claim 2, wherein providing the OSD message indicating whether a video signal has been detected on each of the plurality of video inputs comprises, where no video signal has been detected on any of the plurality of video inputs, generating an artificial video signal on which the OSD message is able to be displayed.

6. The method of claim 1, wherein positively indicating to the user whether a video signal has been detected on each of the plurality of video inputs comprises, for each video input, turning on a light corresponding to the video input where a video signal has been detected on the video input.

7. The method of claim 1, wherein detecting whether a video signal is present on each of a plurality of video inputs comprises calling a function for each video input provided by an integrated circuit, the function returning whether a video signal is present on the video input.

8. A display device comprising:
a plurality of video inputs including all video inputs of the display device, each video input receptive to a corresponding connector communicatively connected to a video source device over which a video signal is able to be received;
a display mechanism to display a video signal received at a currently active video input;
a detection mechanism to detect whether a video signal is present on each video input; and,
an indication mechanism to positively indicate to a user, simultaneously for each video input in said plurality having a detected video signal and each video input in said plurality without a detected video signal, whether a video signal is present on said video input, by, for each video input,
where a video signal has been detected on the video input, positively indicating to the user in a first manner that a video signal has been detected on the video input;
where a video signal has not been detected on the video input, positively indicating to the user in a second manner that a video signal has not been detected on the video input, the second manner being such that the user is notified that the video input exists.

9. The display device of claim 8, wherein the detection mechanism comprises an integrated circuit capable of detecting whether a video signal is present on each video input.

10. The display device of claim 8, wherein the indication mechanism is to provide an on-screen display (OSD) message comprising a representation of each video input, where the representation of the video input is highlighted when a video signal has been detected on the video input.

11. The display device of claim 10, wherein the representation of each video input is highlighted in the first manner when a video signal has been detected on the video input, and the representation of the currently active video input is highlighted in the second manner.

12. The display device of claim 11, further comprising an input mechanism by which a user is able to differently select the currently active video input from among the plurality of video inputs.

13. The display device of claim 10, wherein the display mechanism is to generate an artificial video signal on which the OSD message is able to be displayed where no video signal has been detected on any of the plurality of video inputs.

14. The display device of claim 8, wherein the indication mechanism comprises a plurality of lights corresponding to the plurality of video inputs, each light turned on when a video signal has been detected on the corresponding video input.

15. The display device of claim 14, wherein each light is located proximate to the video input to which the light corresponds.

16. The display device of claim 14, further comprising a housing, the plurality of video inputs located on a first side of the housing, and the plurality of lights located on a second side of the housing.

17. The display device of claim 8, wherein the currently active video input is selected based on a user-configurable priority ordering of the plurality of video inputs.

18. The display device of claim 8, wherein the plurality of video inputs comprise at least one or more of: an s-video input, a composite video input, a component video input, a VGA input, a DVI input, and an FIDMI input.

19. The display device of claim 8, wherein the display device comprises one of: a projector and a flat-panel display.

20. A display device comprising:
a plurality of video inputs including all video inputs of the display device, each video input receptive to a corresponding connector communicatively connected to a video source device over which a video signal is able to be received;
means for detecting whether a video signal is present on each video input; and,
means for positively indicating to a user, simultaneously for each video input in said plurality having a detected video signal and each video input in said plurality without a detected video signal, whether a video signal is present on said video input, by, for each video input,
where a video signal has been detected on the video input, positively indicating to the user in a first manner that a video signal has been detected on the video input;
where a video signal has not been detected on the video input, positively indicating to the user in a second manner that a video signal has not been detected on the video input, the second manner being such that the user is notified that the video input exists.

21. The display device of claim 20, wherein the means for positively indicating to the user whether a video signal is present on each video input is further for providing an on-screen display (OSD) message comprising a representation of each video input that is highlighted when a video signal has been detected on the video input.

22. The display device of claim 21, wherein the representation of each video input is highlighted in the first manner when a video signal has been detected on the video input, and the representation of a currently active video input is highlighted in the second manner, the display device further comprising means for receiving input from a user by which the currently active video input is differently selected from among the plurality of video inputs.

23. A non-transitory computer-readable medium having a computer program stored thereon comprising:
a first computer program part to determine whether a video signal has been detected on each of a plurality of video inputs of a display device including all video inputs of the display device; and,
a second computer program part to positively indicate to a user, simultaneously for each video input in said plurality having a detected video signal and each video input in said plurality without a detected video signal, whether a video signal has been detected on said video input, by, for each video input,
where a video signal has been detected on the video input, positively indicating to the user in a first manner that a video signal has been detected on the video input;
where a video signal has not been detected on the video input, positively indicating to the user in a second manner that a video signal has not been detected on the video input, the second manner being such that the user is notified that the video input exists.

24. The non-transitory computer-readable medium of claim 23, wherein the first computer program part is to call for each video input a function provided by an integrated circuit, the function returning whether a video signal is present on the video input.

25. The non-transitory computer-readable medium of claim 23, wherein the second computer program part is provide an on-screen display message indicating whether a video signal has been detected on each of the plurality of video inputs by displaying a representation of each video input, highlighting in the first manner the representation of each video input where a video signal has been detected on the video input, and highlighting in the second manner the representation of a currently active video input.

26. The non-transitory computer-readable medium of claim 25, further comprising a third computer program part to receive user input by which the currently active video input is differently selected from among the plurality of video inputs.

* * * * *

UNITED STATES PATENT AND TRADEMARK OFFICE
CERTIFICATE OF CORRECTION

| | | |
|---|---|---|
| PATENT NO. | : 7,728,911 B2 | Page 1 of 1 |
| APPLICATION NO. | : 11/043533 | |
| DATED | : June 1, 2010 | |
| INVENTOR(S) | : Reed H. Lacy et al. | |

It is certified that error appears in the above-identified patent and that said Letters Patent is hereby corrected as shown below:

In column 8, line 11, in Claim 18, delete "FIDMI" and insert -- HDMI --, therefor, In column 9, line 10, in Claim 25, after "is" insert -- to --.

Signed and Sealed this

Twelfth Day of October, 2010

David J. Kappos
*Director of the United States Patent and Trademark Office*